United States Patent [19]

Carlsen

[11] Patent Number: 5,384,902
[45] Date of Patent: Jan. 24, 1995

[54] METHOD FOR GENERATING A FAST INVERSE TABLE

[75] Inventor: Stephen E. Carlsen, Issaquah, Wash.
[73] Assignee: Aldus Corporation, Seattle, Wash.
[21] Appl. No.: 813,963
[22] Filed: Dec. 24, 1991
[51] Int. Cl.$^6$ ............................................. G06F 15/62
[52] U.S. Cl. ....................................... 395/131; 395/132
[58] Field of Search ................ 395/131, 132, 161, 109, 395/162, 163, 164; 358/13, 31, 32, 316, 518, 519; 345/22, 27, 76, 78, 147, 186

[56] References Cited

U.S. PATENT DOCUMENTS

| | | | |
|---|---|---|---|
| 4,847,677 | 7/1989 | Music et al. | 358/13 |
| 4,901,258 | 2/1990 | Akiyama | 365/577 |
| 4,974,070 | 11/1990 | Hock et al. | 358/78 |
| 4,974,171 | 11/1990 | Yeh et al. | 395/109 |
| 4,991,122 | 2/1991 | Sanders | 395/131 |
| 5,003,494 | 3/1991 | Ng | 395/109 |
| 5,025,249 | 6/1991 | Seiler et al. | 359/131 X |
| 5,038,300 | 8/1991 | Seiler et al. | 395/131 |
| 5,045,967 | 9/1991 | Igarashi | 395/131 |
| 5,062,058 | 10/1991 | Morikawa | 395/131 |
| 5,065,147 | 11/1991 | Rice et al. | 395/132 X |
| 5,228,120 | 7/1993 | Farr et al. | 395/131 |
| 5,233,684 | 8/1993 | Ulichney | 395/131 |
| 5,235,677 | 8/1993 | Needle et al. | 395/131 |
| 5,251,298 | 10/1993 | Nally | 395/131 |

OTHER PUBLICATIONS

Friedman, J. H., et al., "An Algorithm for Finding Best Matches in Logarithmic Expected Time," *ACM Transactions on Mathematical Software*, vol. 3, No. 3, Sep. 1977, pp. 209–226.

Heckbert, P., "Color Image Quantization for Frame Buffer Display," *Computer Graphics*, vol. 16, No. 3, Jul. 1982, pp. 297–307.

*Primary Examiner*—Heather R. Herndon
*Assistant Examiner*—Cliff N. Vo
*Attorney, Agent, or Firm*—Christensen, O'Connor, Johnson & Kindness

[57] ABSTRACT

A large set of image data values are associated with a smaller set of values, such as color palette look-up table (LUT) indices, to create an inverse table. The larger set of image data values address into the inverse table. The inverse table is simulated as a symmetrical N-dimensional structure in computer memory, with N being the color dimension of the image data values. Generally, a set of star spaces in the structure are captured by the color palette LUT indices; the capturing is based on some relationship such as the relationship between the image data values and the color palette values indexed by the color palette LUT indices. The remainder of the structure spaces are captured by performing a uniform and iterative expansion away from each star space, capturing each uncaptured space encompassed by the expansion until all spaces are captured. The capturing of a space by a particular star corresponds to the entry of the capturing star value (color palette LUT index) into the inverse table at an address corresponding to the captured space. Using this type of iterative process, the inverse table is rapidly filled with color palette LUT indices, which, in turn, identify good approximations of the image data values by the color palette values in the LUT.

12 Claims, 12 Drawing Sheets

| | |
|---|---|
| 0 | 2 |
| 1 | 2 |
| 2 | 0 |
| 3 | 0 |
| 4 | 0 |
| 5 | 0 |
| 6 | 0 |
| 7 | 0 |
| 8 | 2 |
| 9 | 2 |
| 10 | 2 |
| 11 | 0 |
| 12 | 0 |
| 13 | 0 |
| 14 | 0 |
| 15 | 0 |
| 16 | 2 |
| 17 | 2 |
| 18 | 2 |
| 19 | 0 |
| 20 | 0 |
| 21 | 0 |
| 22 | 0 |
| 23 | 0 |
| 24 | 2 |
| 25 | 2 |
| 26 | 2 |
| 27 | 0 |
| 28 | 0 |
| 29 | 1 |
| 30 | 1 |
| 31 | 1 |

| | |
|---|---|
| 32 | 2 |
| 33 | 2 |
| 34 | 2 |
| 35 | 2 |
| 36 | 1 |
| 37 | 1 |
| 38 | 1 |
| 39 | 1 |
| 40 | 2 |
| 41 | 2 |
| 42 | 2 |
| 43 | 2 |
| 44 | 1 |
| 45 | 1 |
| 46 | 1 |
| 47 | 1 |
| 48 | 2 |
| 49 | 2 |
| 50 | 2 |
| 51 | 1 |
| 52 | 1 |
| 53 | 1 |
| 54 | 1 |
| 55 | 1 |
| 56 | 2 |
| 57 | 2 |
| 58 | 1 |
| 59 | 1 |
| 60 | 1 |
| 61 | 1 |
| 62 | 1 |
| 63 | 1 |

*FIG. 7.*

METHOD FOR GENERATING A FAST INVERSE TABLE

FIELD OF THE INVENTION

The present invention relates to the generation of an inverse table, which is a mapping of a large set of data values to a smaller set, and in particular to the fast generation of the inverse table entries using an iterative value capturing technique.

BACKGROUND OF THE INVENTION

The use of computers as everyday tools has increased dramatically as the cost of computer related technologies has decreased. However, for the computer to truly be a commonly used tool, it must operate at speeds acceptable to the average, often impatient, user. Generally, processing speed is a high visibility characteristic in any computer system. While processing speed is just one of many important performance characteristics, it is of major importance in widely used applications. For example, as computer generated graphics have evolved, computer generated displays have moved from low resolution black and white to high resolution color. Each step in the display evolution was not considered complete until the speed of generating and displaying an image was within acceptable limits.

In the example of computer generated color displays, a variety of different technologies combined to produce a displayable image. For example, the image data, such as video or scanned images, must be gathered and organized in a useful manner. The image data is then formatted to drive the display hardware, with or without additional data processing. Each of these steps requires its own refinement as well as careful integration into the overall display process. Because the field of computer generated color displays particularly benefits from the present invention, basic concepts of such display systems are presented in some detail to aid in understanding of the invention. However, it is to be understood that the present invention has application in any number of computer related applications.

In order to better understand the present invention, a brief discussion of what his become relatively standard color image display technology is presented. As shown in FIG. 1, 8-bit (byte) image data is used to address a color palette look-up table (LUT) 110. 8-bit addressing allows up to 256 unique color values to be addressed. In a Red, Green and Blue (RGB) system, each color palette LUT entry 112 is a color value made up of three color components. The particular bit size of the LUT entries depends on each system. For example, each color palette value may be 12-bits; 4-bits are used to represent a hue (graduation) of each of the three colors. When a color palette LUT entry is addressed, the selected color palette value is output to a digital-to-analog (DAC) converter 114, which produces an analog display signal. The analog display signal is transmitted to a video device 116 for display. A color palette value is selected for each picture element (pixel) in the video display to produce an entire screen display. Additional display hardware components, of which there are many, that are not necessary to the present discussion are not shown.

Although such a standard system provides only a 256 unique color selection for any given pixel, by changing the color palette values in the color palette LUT, the particular set of colors from which a pixel value may be chosen can be changed. For example, one color palette might include shades of gray, another might include autumn colors, another might include pastels, etc. Most systems include a mechanism by which the user or an application can select a color palette.

Given such a system, as long as the gathered image data is in an 8-bit format, the image display process is relatively straightforward. The display process speed is dictated in part by the speed of the transfer of image data from storage to the display hardware and the processing speed of the display hardware itself.

However, further processing is necessary when the image data format is incongruous with the format of the LUT address data that drives the display device. As an example, computerized scanning devices often generate 24-bit image data, sets of which define high resolution images. (Each 24-bits is comprised of 8-bits each of Red, Green and Blue, or some other 3- or 4-dimensional color space.) With 24-bits of information, over 16 million distinct values can be represented. In contrast, using an 8-bit LUT, only 256 distinct values can be displayed. Thus, in order to drive an 8-bit display device using such scanned dam, each 24-bit image data value must be associated with a value in the smaller color palette set. If such an association is fairly uniform, then each color palette value would be associated with approximately sixty-two thousand scanned image data values. However, the association between image data values and color palette values is generally not uniform since most color palettes are not meant to simply be a balanced subset of the entire available color spectrum. Thus, each time the color palette changes, the association between the image data values and the color palette values may also change.

There are other methods for displaying color information. For example, some 24-bit to 8-bit display techniques assume a fixed, carefully optimized palette. These techniques can be used in systems wherein one image is displayed at a time. In contrast, in systems such as desk top publishing a number of images may be displayed on a single screen. The display techniques in these systems do not have the luxury of the assumptions in single image displays since it is likely that each of the multiple images will require its own unique color palette.

With reference again to FIG. 1, the association process can be carried out using an inverse table 118. Such a table is addressed by the image data values, and the inverse table entries are indices for the color palette LUT. The term "inverse" refers to the table's characteristic of mapping a large set of values (such as 8-bit image data values) onto a smaller set of values (such as 8-bit color palette indices). This is contrasted with the "normal" color palette LUT, which maps a set of values (color palette indices) to an equal size set of values (color palette values).

The combined inverse table and color palette LUT map each 24-bit image data value to its closest color palette value. The color palette LUT indices represent an intermediate mapping between the image data value (inverse table index) and the color palette value. In computer display technology, the intermediate mapping is generally necessary because the color palette LUT is a part of a hardwired display device. Thus, it is not an option to connect the inverse table entry output directly to the DAC, or other display device component. If such a connection were possible, then the inverse table entries could be the actual color palette values. It is general practice to connect the inverse table entry output, or some other address source, to the color palette LUT to control the color palette value selections.

As noted above, the color palette may intermittently change to accommodate the display color specification. Generally, this causes the mapping of the 24-bit image data values to the color palette values to also change. Thus, the inverse table entries must be updated each time the color palette changes. Recalling that this color palette change is expected to result in a nearly immediate change in the display and that the inverse table may be quite large, the task of generating the inverse table entries in a satisfactory manner is not trivial. This is one of the main problems addressed by the present invention.

One method of generating the inverse table entries is to simply compare each 24-bit image data value to each of the color palette values, selecting the color palette value that is closest to the image data value and entering the color palette index corresponding to the selected palette value in the inverse table. In the case of 12-bit color palette values, the comparison might be made between the color palette value and a 12-bit value created from the four most significant bits of each color component. This would require $2^{12} \times 256$ 3-dimensional distance and comparison calculations. While this method might provide the most exact mapping between the 24-bit image data values and the color palette values, generation of the inverse table in this fashion would take an objectionably long time and be considered a waste of computer resources. The present invention is directed to overcome these problems and provide a method of rapidly generating an inverse table using a minimum of computer resources.

While the present invention was designed for use in generating an inverse table in a color display environment, it potentially has use in other areas of the computer art where a need exists for a method of efficiently and economically generating an inverse table. The general definition of such a table is an intermediate structure, (an inverse table) that associates in some manner a relatively large set of source values with a smaller set of destination values.

SUMMARY OF THE INVENTION

The present invention is an efficient method of generating an inverse table that is applicable in any N-dimensional component system. The inverse table maps a large set of source values to a smaller set of destination values. The "map" between a source value and destination value signifies a relatively close approximation of some preestablished relationship between the source and destination values. In the art of computer color display generation, the source values are image data values and the destination values are color palette indices. The mapping between the source and destination values is based on a relationship between the image data values and the color palette values indexed in a color palette LUT by the color palette indices.

The inverse table is generated by simulating an N-dimensional structure of spaces, wherein the space coordinates are directly related to the inverse table addresses. The inverse table addresses make up a relatively large set of X image data values. Each image data value has a binary representation of N components. In contrast, the color palette indices make up a smaller set of values, each of which represents an N component palette look-up table value. The method includes the steps of establishing an inverse table and simulating an N-dimensional structure in a memory device, identifying star spaces in the structure that are initially captured by each color palette index, and capturing each space in the structure by one of the star spaces by uniformly expanding out from each star space in a controlled manner.

Generally, the inverse table has entries, each of which is addressable by a value from the image data value set. The image data values are each r-bits. The N-dimensional symmetrical structure is of size q, wherein $q^N = 2^r$. The structure comprises spaces having space coordinates corresponding to an inverse table addresses or image data values. At initialization, each color palette index captures a star space in the structure. In a color display system, this capturing can be based on the relationship between the inverse table address and the color palette value associated with a particular color palette index. In other applications, the relationship might be a direct relationship between an inverse table address and values from the smaller set themselves. No matter the relationship, the initial identification is the only comparative step that is required. Thereafter, the method determines associations between source and destination values from the N-dimensional structural relationships.

In order to capture each space, and thus complete the inverse table, beginning with unit counter $J=0$, for each star space, the process expands out J spaces from the star space in each of 2N possible directions, captures each uncaptured space encompassed by the expansion, and repeats the process after incrementing the value of J by one. At the first iteration, only the star spaces themselves are captured. For each space that is captured, an inverse table entry, the address of which corresponds to the particular captured space coordinates, is filled by the color palette index associated with the capturing star space. In this manner, each inverse table entry is associated with a color palette value that is a close approximation to the corresponding image data via the color palette indices.

In accordance with further aspects of the present invention, the simulated structure and the inverse table are formed as a single data structure in the computer memory device. Then, the step of capturing a space with a star value fulfills the step of entering a star value into the inverse table at an address corresponding to the captured space coordinates.

In accordance with additional aspects of the present invention, a capture flag is incorporated into the simulated structure, such that each space is associated with a capture flag. The step of capturing each uncaptured space includes the step of setting the capture flag as captured when a space is captured, such that the space will no longer be analyzed.

In accordance with yet other aspects of the present invention, during the step of expanding out J spaces from a star space, a determination is made about whether each space encompassed by the expansion is beyond the borders of the structure. Any spaces beyond the border are not analyzed. In addition, if no spaces are captured when expansion is performed in a particular direction (one of the 2N directions), expansion in that direction is no longer performed for that star space in that direction.

One facet of the present invention is that the process works for any dimension N of color components. For example, the color may be one-dimensional (e.g., black and white), two-dimensional (e.g., red and green), three-dimensional, e.g., RGB, and four-dimensional, e.g., cyan, magenta, yellow, and black (CMYK). The present method for fast generation of an inverse table is applicable to display processing regardless of the dimension of the color display.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 is a representative inverse table generated during a two-dimensional color palette mapping method related to the diagrams of FIGS. 5A-5E.

DETAILED DESCRIPTION OF THE PREFERRED EMBODIMENT

As will be better understood from the following discussion, the present invention is an efficient method of generating an inverse table for an N-dimensional component system. The inverse table maps a large set of source values to a smaller set of destination values. When applied to computer generated color displays, inverse table addresses are image data values, star values are color palette LUT indices, and initial mappings are determined by image data value and color palette value relationships.

The method of the present invention is best carded out by a computerized system including a central processor, a memory device and an input/output component. A computer program for controlling the method is stored in the memory device for access by the central processor. The inverse table is established as a data structure in memory accessible by the central processor. The input/output component includes the display device, which includes a color palette LUT. In accordance with the present invention, when necessary, the program causes the central processor to generate the inverse table. Then, the central processor under control of other computer programs generates a display that utilizes the inverse table.

Figure 1:
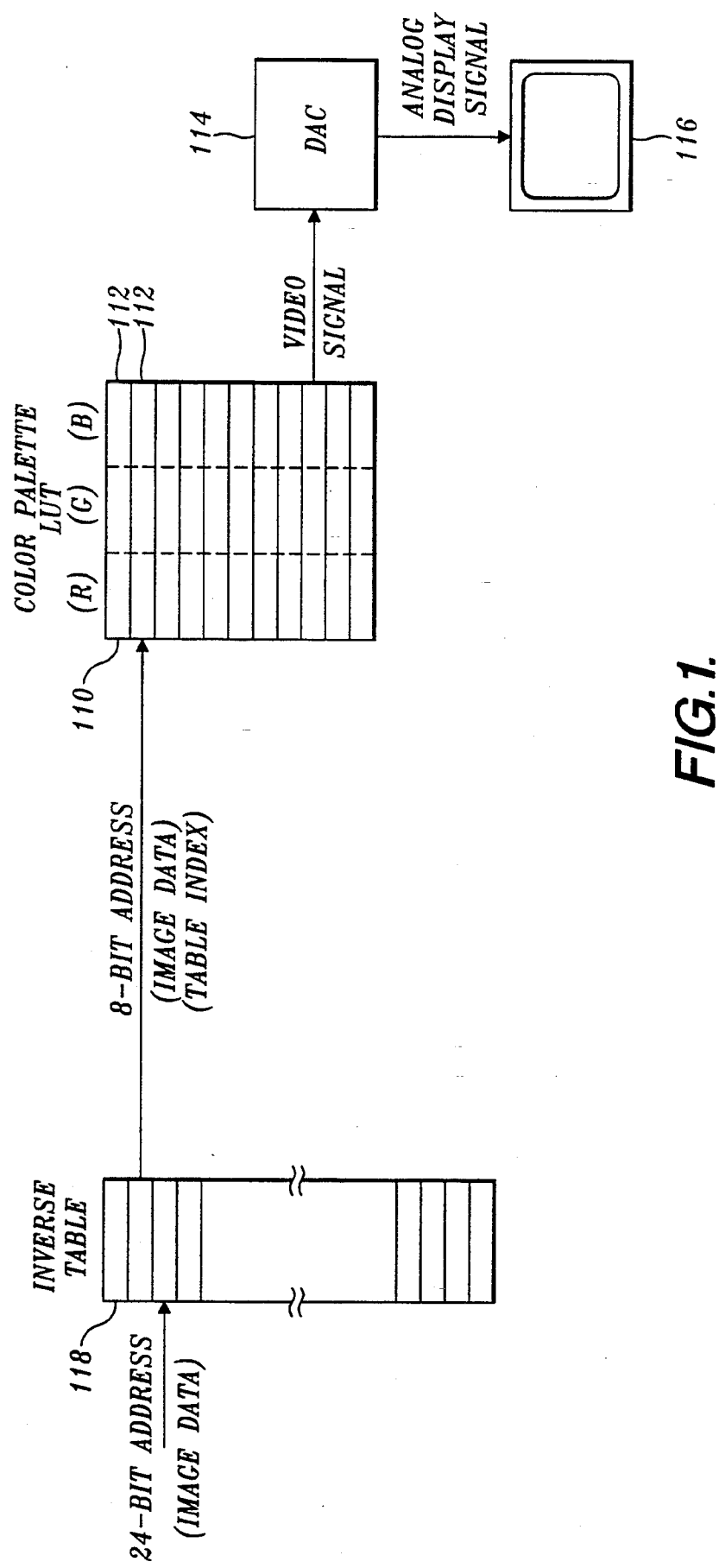
FIG. 1 is a block diagram of a prior art 24-bit color image display system.
Figure 2:
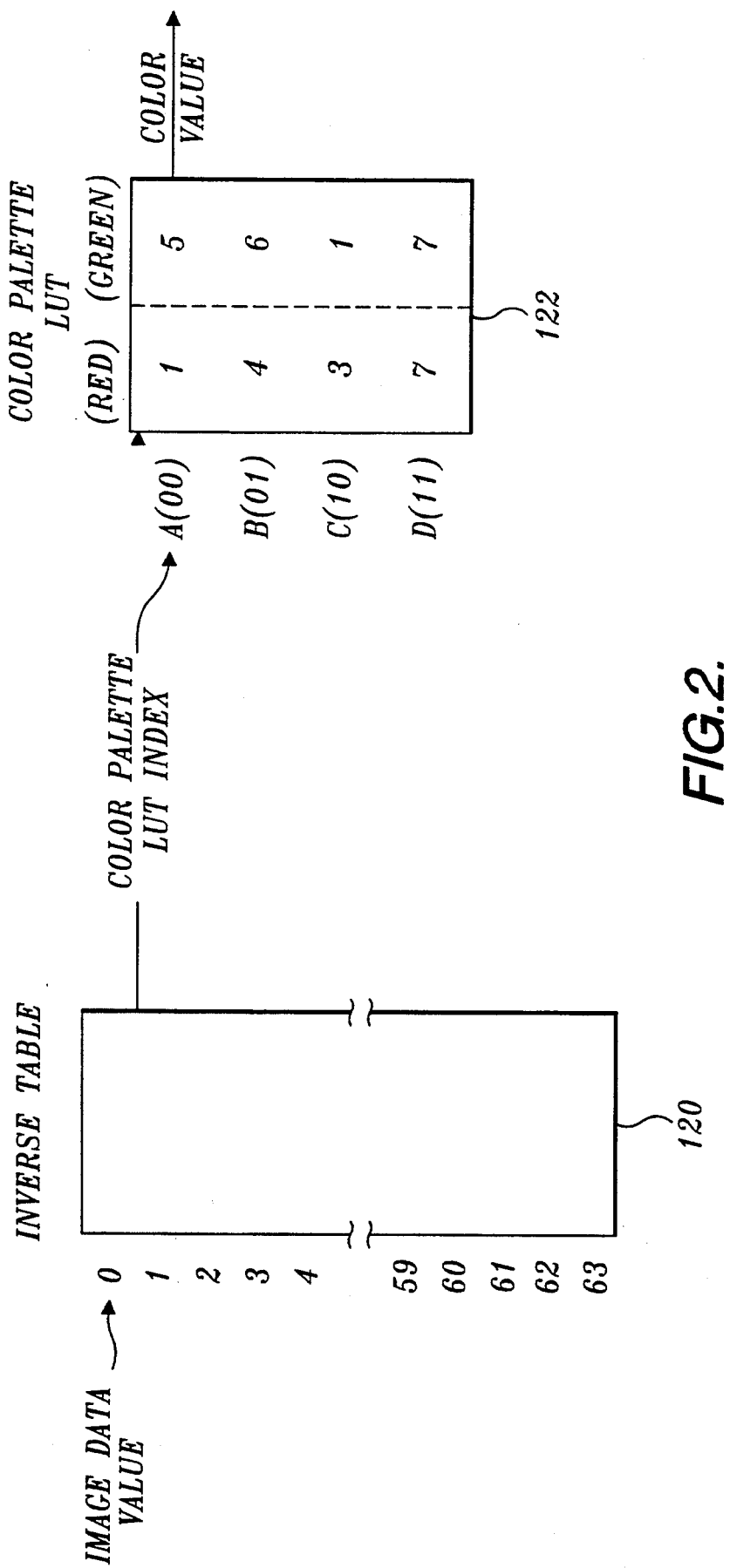
FIG. 2 is a block diagram of a color display 6-bit image data inverse table to be mapped to a 3-bit color palette LUT, wherein the inverse table is generated in accordance with the present invention.

For ease of understanding, a simple 2-dimensional example is first provided. The concepts of inverse table generation described in conjunction with this example are equally applicable in systems using greater than two dimensions of color, or even one-dimension. With reference to FIG. 2, the chosen dimensions are the colors Red and Green. The image data is 6-bit data made up of 3-bits each of red and green information. Thus, the image data can describe sixty-four unique values. These values are used to address an inverse table 120.

In contrast to the sixty-four values of the inverse table, a color palette LUT 122 shown in FIG. 2 can only hold four entries, addressed by two bit binary values-00, 01, 10, and 11, referred to respectively as entries A, B, C and D. Even though the color palette has only four entries, the color values themselves are represented by 6-bits; again, 3-bits each of Red and Green are used to drive the video display. The inverse table is used to map each 6-bit image data value to one of the four color palette values in the color palette LUT via a color palette LUT index.

In this example, the color value LUT (Red,Green) entries are A (1,5), B (4,6), C (3,1) and D (7,7). This representation is referred to as the coordinate form of the color values. The binary representations of the coordinate forms are often concatenated and referred to by their decimal value. For example, A in binary form is (001101), which is 13 in decimal form, B is (100110), which is 38 in decimal form, etc. In a similar manner, each unique inverse table address can form a decimal address between 0-63, the binary representation of which can be split into two components to produce the coordinate form of the value. Both the decimal and coordinate forms of representation are used throughout the present method.

Figure 3:
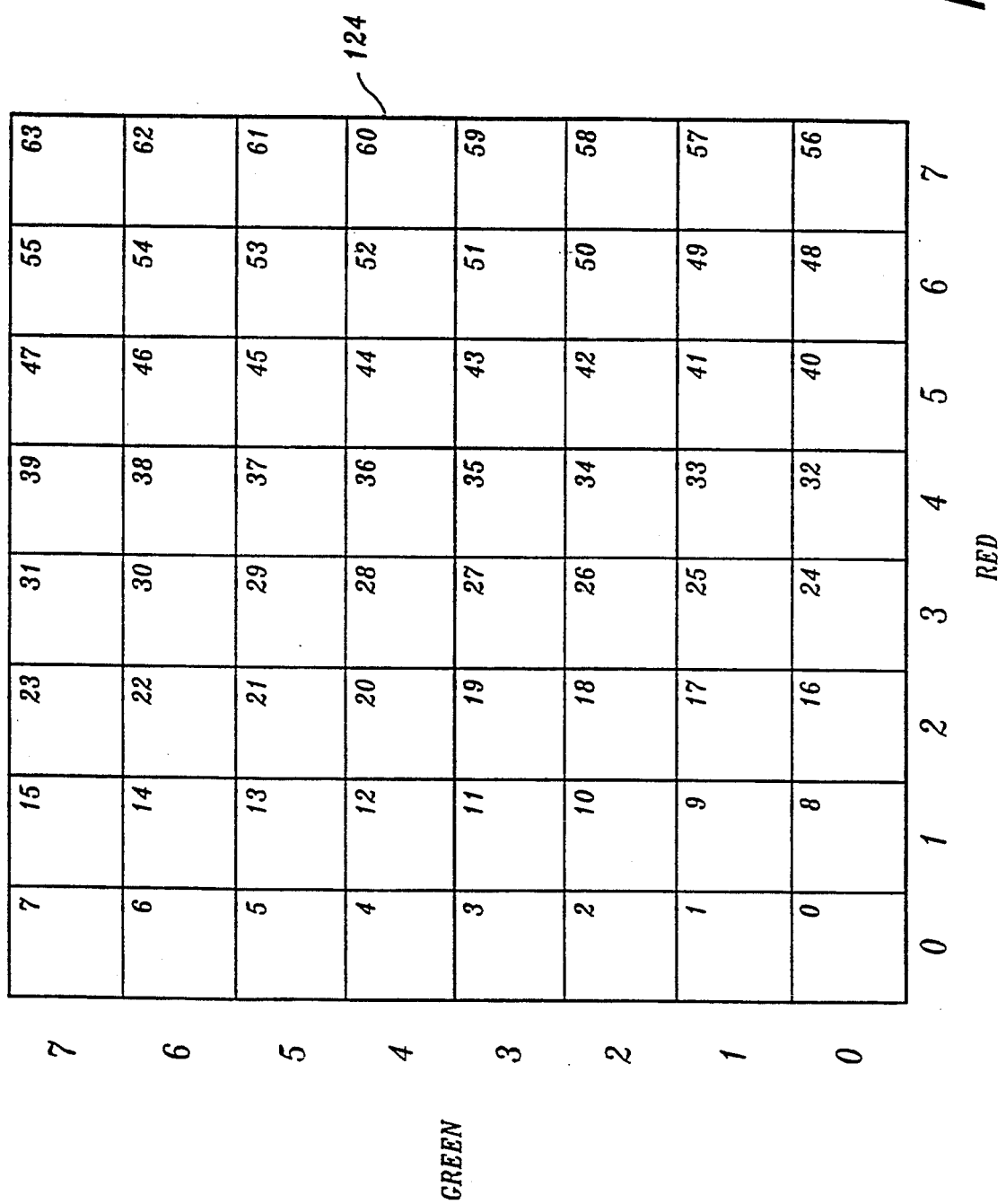
FIG. 3 is a symmetrical two-dimensional simulation of an inverse table.

With reference to FIG. 3, the present invention simulates a symmetrical two-dimensional table structure 124, wherein each of sixty-four inverse table entries is represented by a structure block or space, identified by the numbers 0 through 63 and addressed by (Red,Green) coordinates. The size q, e.g. 8, of the table structure is determined by $q^N = 2^Z$, wherein Z equals the bit size of image data, and N is the color dimension. In this example, the x-axis represents Red information and the y-axis represents Green information. Thus, each space in the table structure 124 corresponds to an inverse table entry. The inverse table address decimal representation are the same as the space identifying numbers set forth in the upper right corner of each space. In a preferred embodiment of the invention, each inverse table entry is associated with a binary capture flag, which is initialized to 0 and then set to 1 when the table entry is filled.

Even in this simple example, the table structure 124 has some meaning from a color representation standpoint. For example, the lower left corner (R=0, G=0) is black, the upper left corner (R=0,G=7) is bright green, the upper right corner (R=7,G=7) is yellow, and the lower right corner (R=7,G=0) is bright red. The structure as a whole represents a uniform distribution of sixty-four colors in a Red and Green spectrum. This is the spectrum from which the image data colors can be selected. In contrast, the actual display of any image generated by this system will appear in only four colors.

Figure 4:
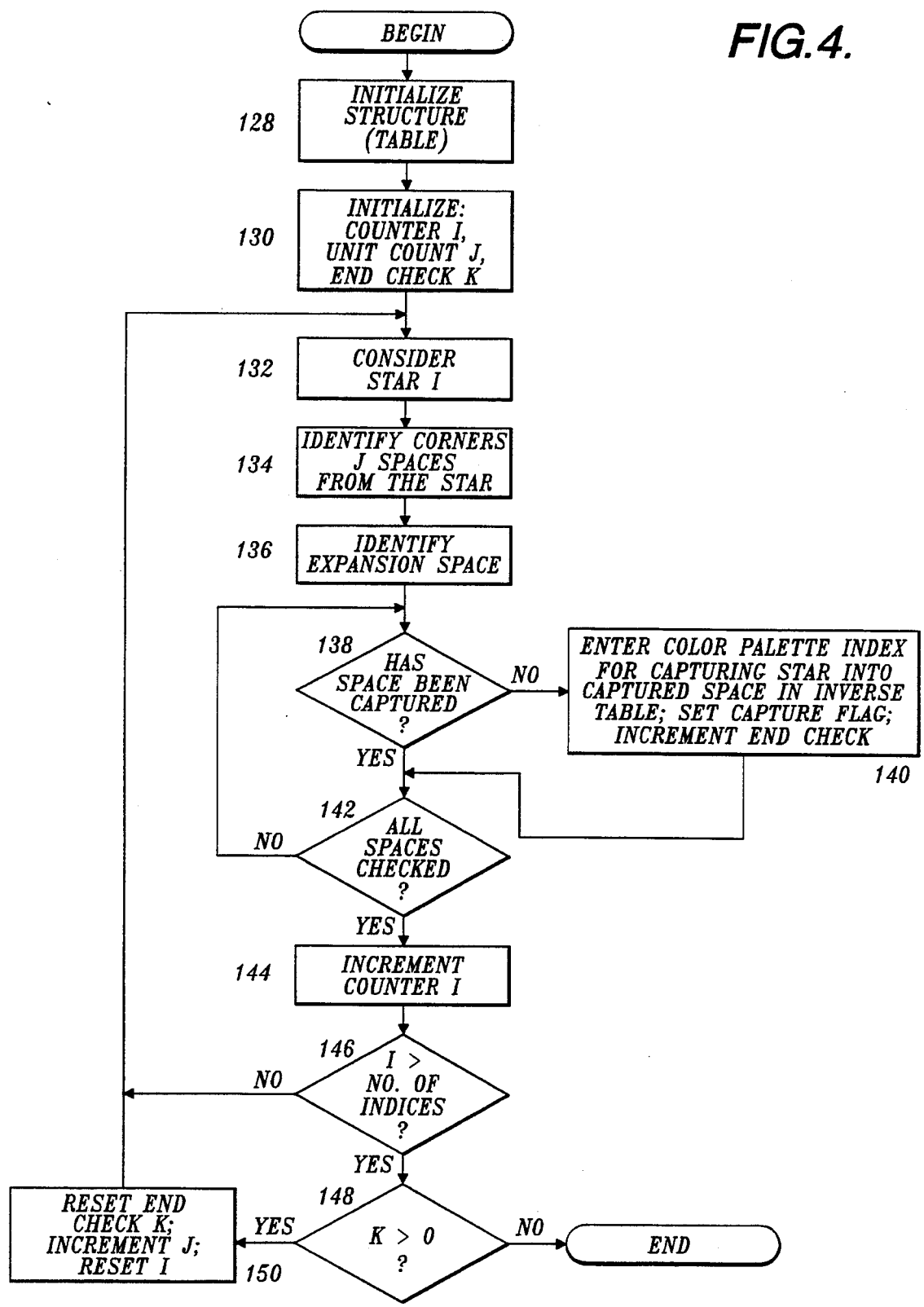
FIG. 4 is a flow diagram of a method of generating an inverse table in accordance with the present invention.

The goal of the present system is to quickly determine which of the four color palette values best represents each of the sixty-four unique image data values. With reference to FIG. 4, a method for generating the inverse table entries includes the steps of initializing the structure and process variables at blocks 128 and 130, of expanding and capturing spaces at blocks 132–136, of updating the inverse table at blocks 138–142 and of performing condition checks at blocks 144–150. The steps between blocks 132 and 150 are repeated until all of the spaces are captured. Once all of the spaces are captured, the inverse table entries are complete and the inverse table can be used in the generation of color displays.

At block 128, the table structure 124 is initialized by mapping each color palette value into the identical or closest value (space) in the table structure. In the example of FIG. 3, wherein the image data and color palette values are both 6-bits, for each color palette value there is a direct correspondence to an image data value. Using the coordinate form of the color palette values, color A (1,5) maps to space 13, color B (4,6) maps to space 38, color C (3,1) maps to space 25, and color D (7,7) maps to space 63. These spaces are referred to as star spaces, each having a unique corresponding color palette index or star value. Referring again to the actual color information represented by table structure 124, space 13 includes a lot of green and a little red, the resulting color is medium green with yellowish/brownish tinge; space 38 has a lot of red and green, making it almost yellow or light greenish tan; space 25 is medium red with a little orange/brown tinge; and space 63 is yellow.

At a block 130, a counter I is set to zero; counter I tracks the stars that have been processed. At each iteration, expansion occurs once for each star. A unit counter J an integer, i.e., is also set to zero. The unit counter identifies how many spaces away from the stars the expansion has proceeded. Finally, end check K is set to zero. The end check is used to determine whether the inverse table is complete. Once this initialization is completed, the spaces are captured by a particular star and thus associated with a color palette index.

Figure 5A:
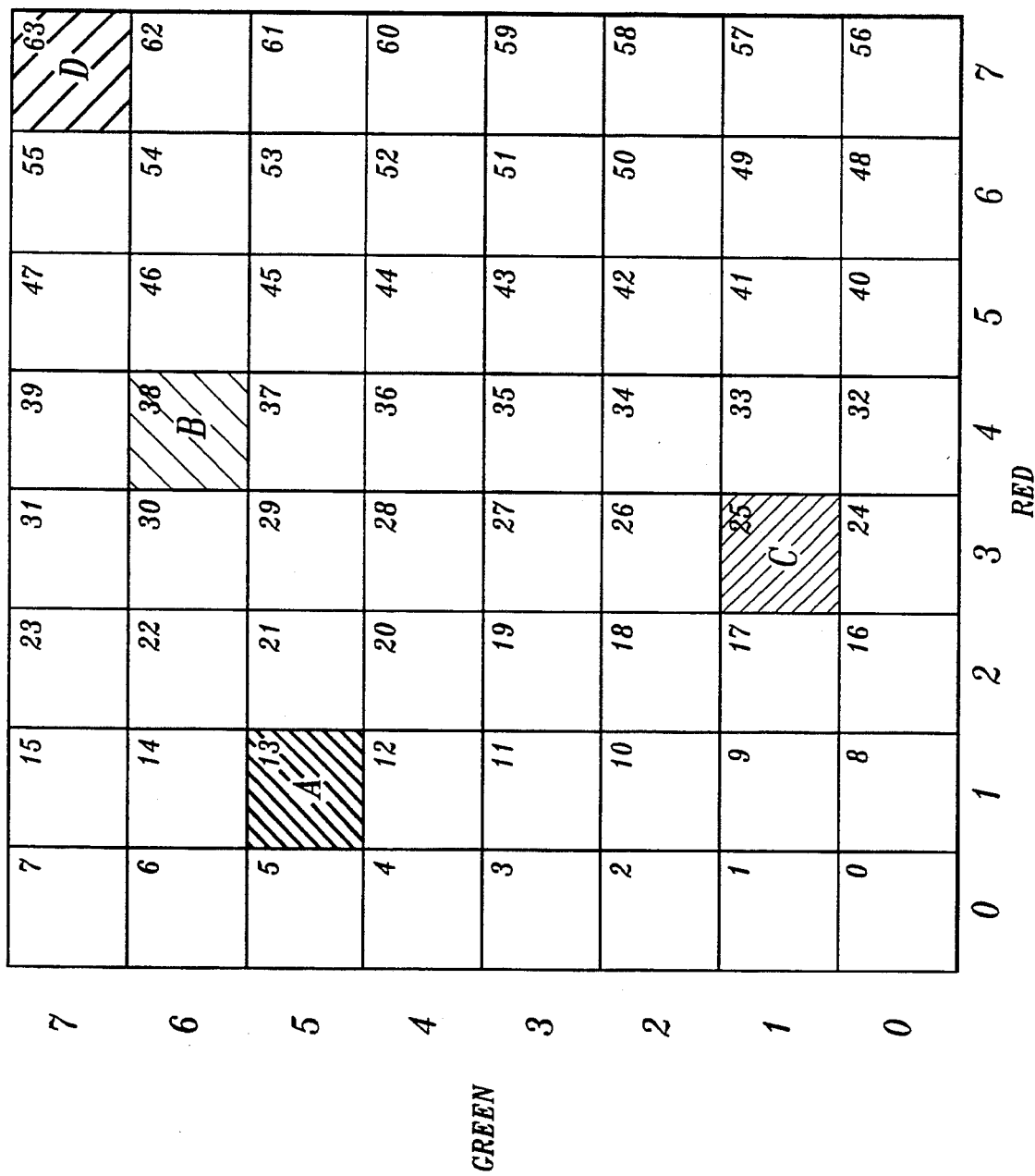
FIGS. 5A-E are pictorial diagrams of the progression of a two-dimensional color palette mapping scheme in accordance with the present invention.

At a block 132, the star associated with the color palette index equal to counter I is considered. The process associated with the first main loop, e.g., blocks 132-150, is trivial since only the star spaces themselves are captured. Generally, using the initial mappings, the inverse table entries at addresses 13, 38, 25 and 63 are filled with the corresponding color palette indices 0, 1, 2 and 3, respectively, as shown in FIG. 5A. Once these entries are completed, the process continues at a block 150, resetting end check K and counter I, and incrementing J by one. At and after the second iteration, the process steps become more significant. Thus, the method will be described in terms of a process that has already entered the color palette indices in the inverse table, thereby producing the structure illustrated in FIG. 5A.

Returning the a block 132, the star A (1,5) and color palette index 0 are the focus of attention. Expansion away from this star is performed by identifying the corner spaces of a square surrounding the star, then identifying the square frame of spaces defined by those corner spaces. The frame is referred to as the expansion space. Thus, at a block 134, the corners of the expansion space are identified as (star coordinate +(J,J), (−J,J), (−J,−J) and (J,−J)). These corners define a complete square J units away from the star space. In the case of star A (1,5), the corners are C1(2,6), C2(0,6), C3(0,4) and C4(2,4). The entire expansion space is identified at a block 136 by traversing a coordinate sequence from C1 to C2 to C3 to C4, along sides S1, S2, S3 and S4. In the example, the expansion frame consists of values (2,6), (1,6), (0,6), (0,5), (0,4), (1,4), (2,4), and (2,5). The corners C and sides S are marked in FIG. 5B for the first expansion from star A.

Each space in the expansion frame is analyzed, one frame at a time to determine whether the space can be captured by the star. At a block 138, a check is made to determine whether the space has already been captured, i.e., whether the capture flag=1 for the corresponding inverse table entry. If the space has not been captured, at a block 140 the color palette index associated with the star is entered in the inverse table at the address corresponding to the space. For example, space (0,1) corresponds to inverse table entry 4; thus, the color palette index 0 is entered at inverse table entry 4. Additionally, the capture flag for the inverse table entry is set to 1 and the end check K is incremented by one. At a block 142, the procedure returns to block 138 if not all of the spaces have been analyzed.

Once all of the frame spaces for a particular star have been analyzed, the counter I is incremented by one at a block 144. If, at a block 146, the counter I is less than the number of entries in the color palette LUT, the process returns to block 132 and expansion from the next star is carried out. Otherwise, at a block 148, expansion has been completed for each star. If end check K is greater than zero, then some expansion occurred during the last iteration and the process should continue; otherwise, no expansion occurred and the process is complete. If, at a block 150 the process is to continue, end check K is reset to zero, unit counter J is incremented by one, and counter I is reset to zero. The process then returns to block 132 to begin the next round of expansion and capturing.

Figure 5B:
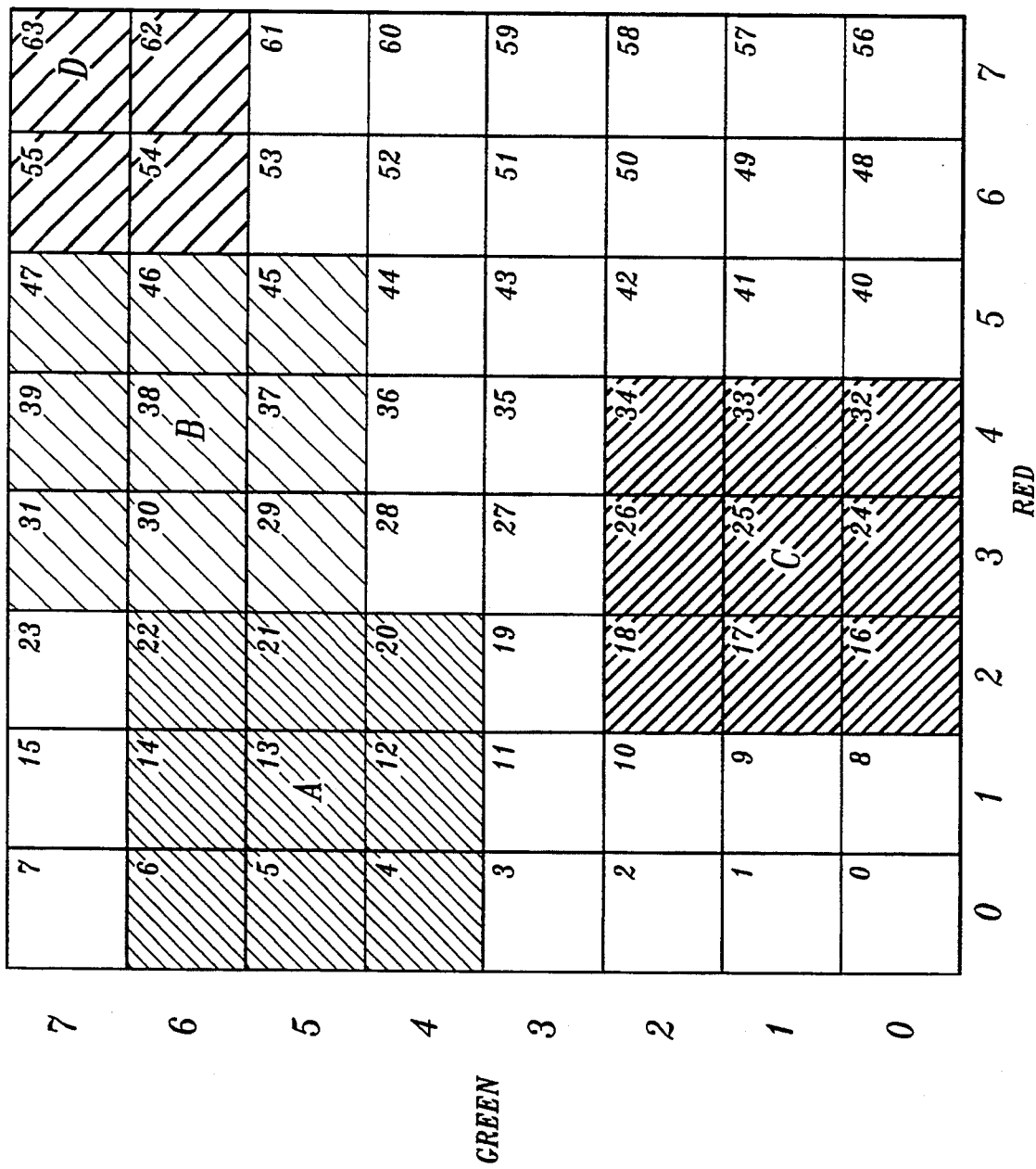
Figure 5C:
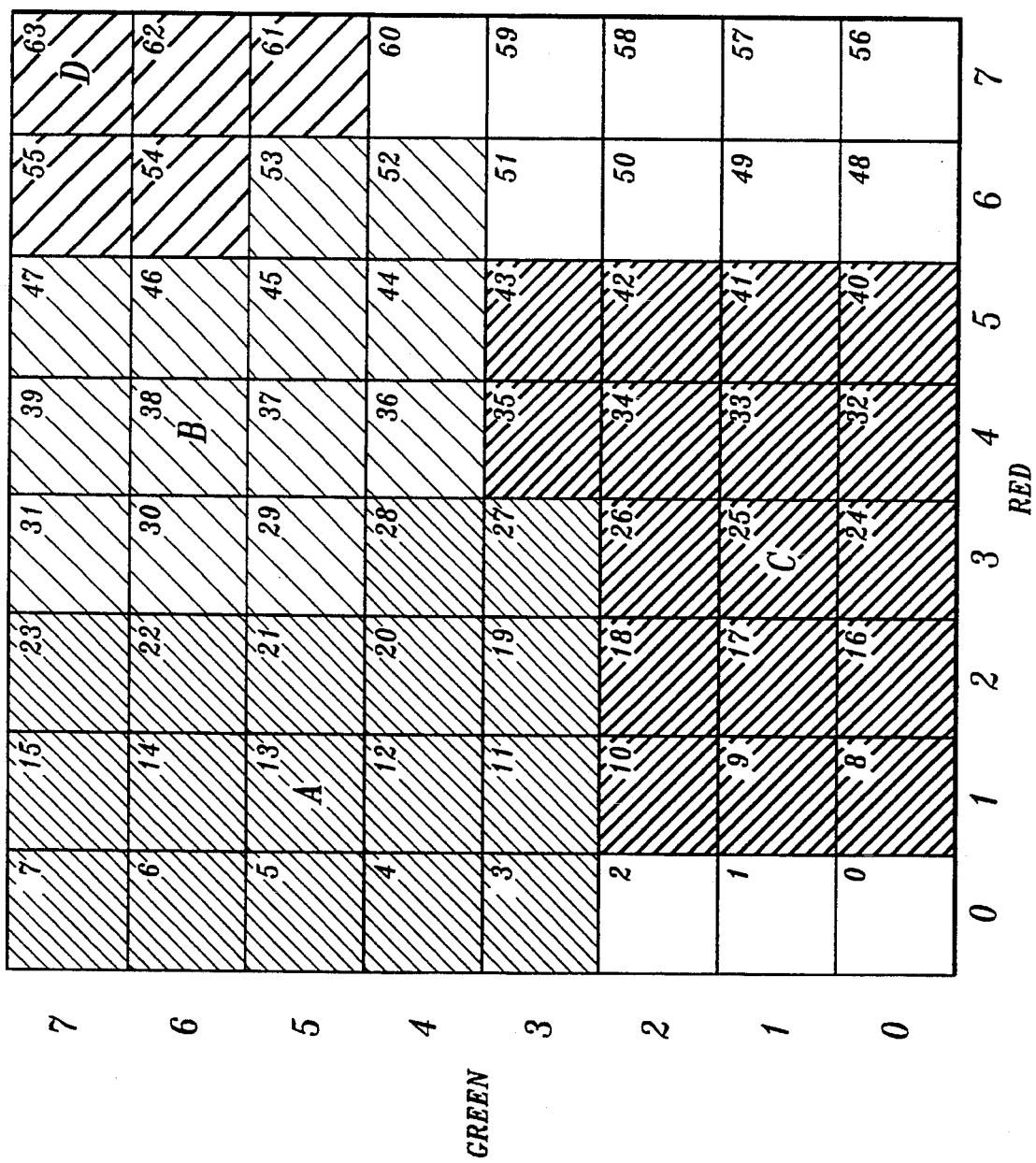
Figure 5D:
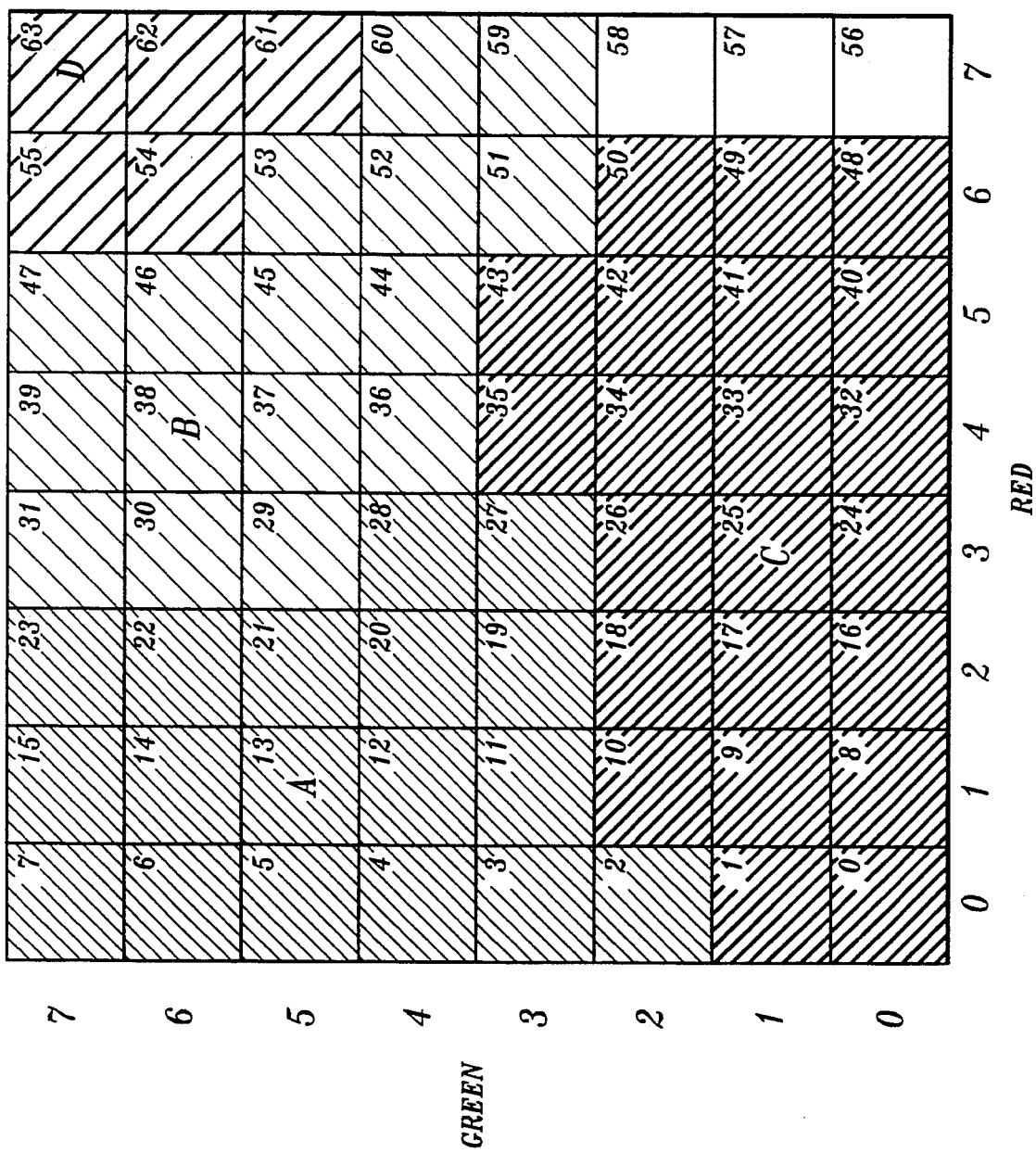

An example initialization and expansion is illustrated in FIGS. 5A-5E. FIG. 5B illustrates expansion with J=1; FIG. 5C illustrates expansion with J=2, and FIG. 5D illustrates expansion with J=3. Because of the linear nature of the process, it is the case that certain spaces that might be captured by more than one star will be captured by the star that is analyzed first. For example, space 23 could be captured by star A or B. However, because star value A is analyzed before star value B, space 23 is captured by star A and thus mapped to color palette value 0. Although the method is not exacting, the benefits provided by such a straightforward process generally outweigh any detrimental result of approximating inverse table entries in this manner.

Figure 5E:
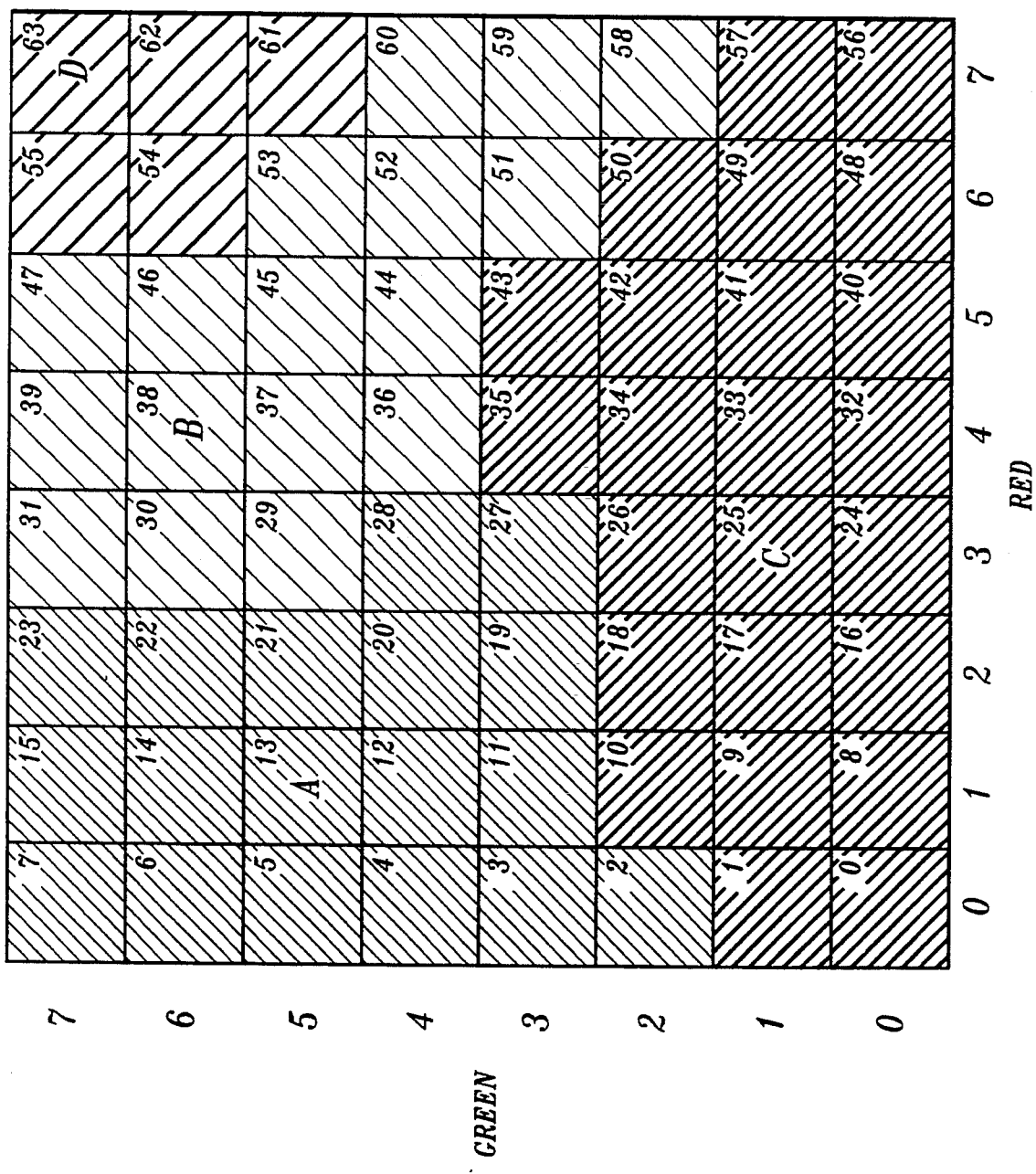
Figure 6:
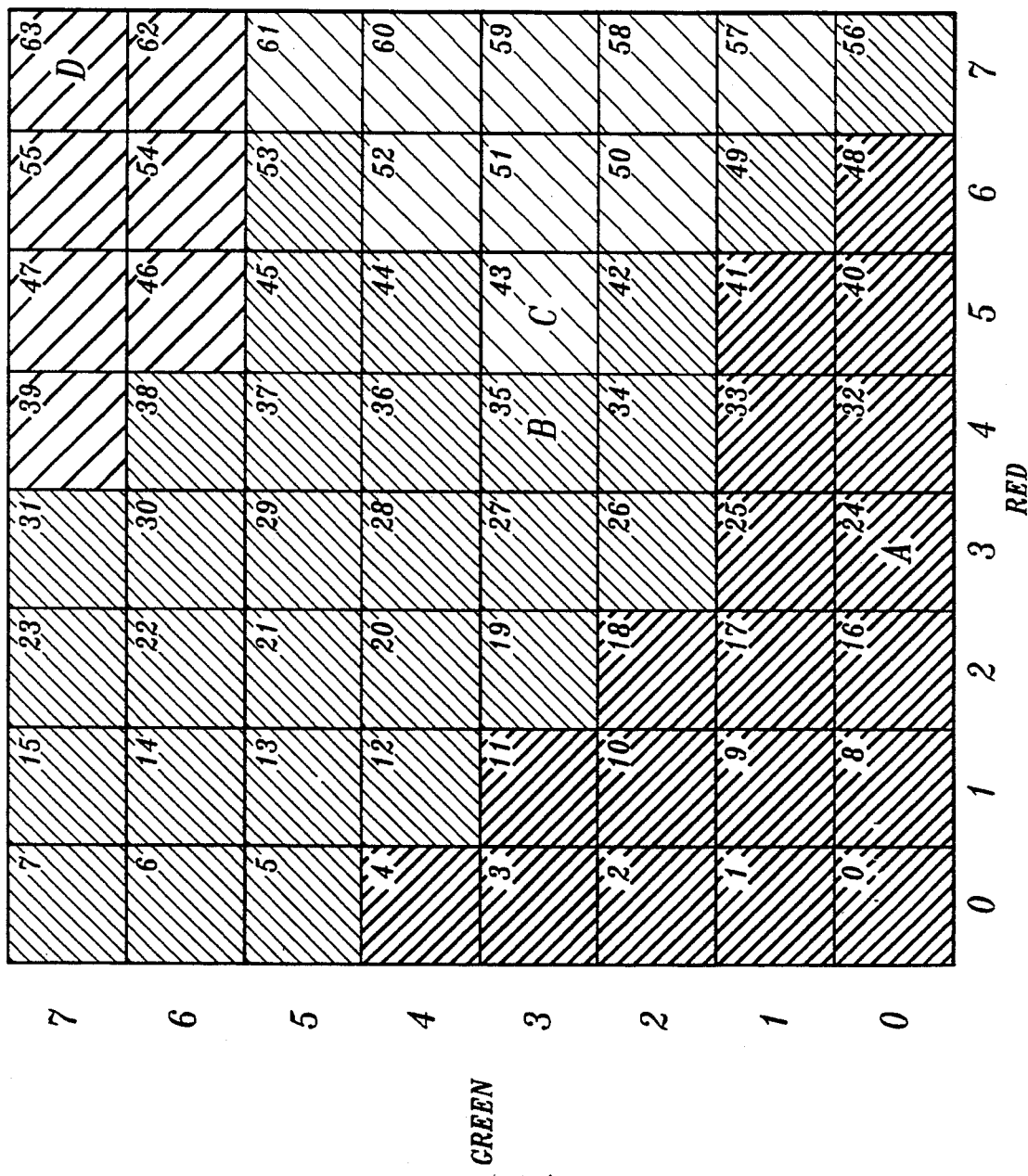
FIG. 6 is a pictorial diagram of a completed two-dimensional color palette mapping.

With reference to FIG. 5E, the graphical depiction of the relationship between the four color palette values and the set of sixty-four image data values helps illustrate the point that the mapping between the large set of image data values is not necessarily evenly distributed over the smaller set of color palette values. With reference to FIG. 6, a different set of color palette values A', B', C' and D' results in a completely different mapping.

No matter the color palette, the result of the expansion process is a completed inverse table, such as the table illustrated in FIG. 7 corresponding to the structure of FIG. 5E. The completed table can immediately be used in color image processing. In use, a 6-bit image data value is used to address the inverse table and extract the color palette LUT index from the addressed entry. The color palette LUT index is then used to look-up the a color palette value that will represent the original 6-bit value. Using the present invention, an accurate inverse table can be generated quickly and with little processing overhead whenever the color palette changes.

While a relatively simple implementation of the present invention is described above, there are a number of preferred implementation steps that result in a more efficient system. For example, once expansion in a particular direction is no longer possible due to collisions with other captured spaces or coincidence with the edge of the structure, the process should cease expansion in that direction. Such a situation is illustrated between FIGS. 5B and 5C. After a one-unit expansion, star A cannot expand in the negative x-direction and star space B cannot expand in the positive y-direction since the edges of the structure has been reached. Similarly, after star A has expanded in FIG. 5C, star B cannot expand in the negative x-direction due to a collision with the spaces captured by star A.

In order to avoid unnecessary processing due to edge encounters and collisions, two condition checks are included in the method and a set of flags associated with each side of each star are maintained. After expansion occurs at block 136 of FIG. 4, the corner spaces are clipped if they fail outside of the structure and the spaces lying between the clipped corners are not analyzed. The side related to any clipped corner pair is set as inactive. Further, if no spaces are captured on a particular side at block 138, the side is set as inactive. Then, prior to performing the analysis of a side of spaces at block 138, the flag for that side will be checked. If the flag is set to inactive, expansion in that direction will not be analyzed.

Figure 8:
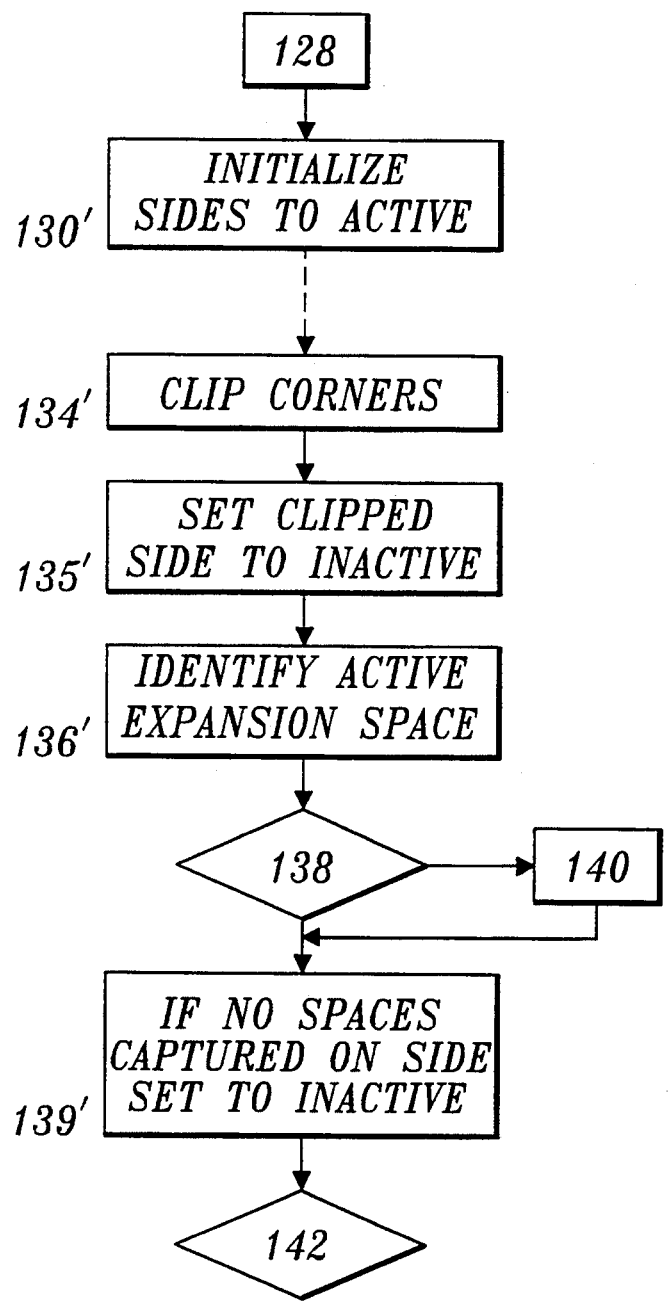
FIG. 8 is a portion of a flow diagram illustrating several alternative steps for carrying out the method illustrated in FIG. 4.

In particular, with reference to FIG. 8, an alternative set of steps that can be incorporated into the method described in conjunction with FIG. 4, begins at a block 130' wherein a set of side flags for each star are initialized to active (1). At a block 134', after each corner is identified, the corners outside of the table structure 124 are clipped. The corners outside the structure are identified by determining whether both coordinate values for a corner are between 0 and 7; if not, the corner is clipped. For example, the corner values for expansion of star A with $J=2$ would be (3,7), (−1,3), (−1,7), and (3,3). Since (−1,3) and (−1,7) are outside of the structure, they are clipped to the next nearest space within the structure and that side of the frame is not analyzed. Thus, C2 (−1,3) is clipped to (0,3) and C3 (−1,7) is clipped to (0,7). Thus, the space identified at block 136' is not a complete square frame.

At a block 135', if a pair of corner values is clipped, the flag for the side S associated with that pair is set to inactive. In the example, side S2 associated with corners C2 and C3 is flagged as inactive.

At a block 136' the expansion spaces are identified only for active sides. For example, when star A expands with $J=2$, side S2 is inactive and corners C2 and C3 were clipped. Thus, the partial frame is determined by traversing from C1 to new C2, new C3 to C4 and C4 to C5. In this manner, expansion is only attempted in directions that are still active and are within the bounds of table structure 124.

At a block 139', analysis of the spaces in the expansion frame is done on a side by side manner. For each active side, if no spaces are captured on that side, the flag for the side is set as inactive. This occurs when expansion in a particular direction is barred by the expansion of another star, rather than by the edge of the structure. For example, when star B is expanded with $J=2$, the expansion frame identified at block 136' includes spaces along the left side of the frame, which is side S2. However, the spaces on that side are spaces 20–23, which were just captured by star A. Thus, at block 139', since no spaces will be captured on side S2, that side will be flagged as inactive. During the next iteration, with $J=3$, the spaces on side S2 will not be analyzed. Using the two checks for inactive sides, a great amount of processing, e.g., checking non-existent spaces and captured spaces at block 138, is avoided.

As noted above, the present invention is not limited to 2-dimensional color schemes. In fact, the most benefit from the invention is expected in applications using 3- and 4-dimensional color schemes. Very little modification to the system described above must be done to accommodate these and other dimension. The modifications for a 3-dimensional system are presented, with the understanding that similar modifications will be made for a 4-dimensional system.

Generally, in a 3-dimensional system each image data value and each color palette value includes three, rather than two components. For example, the image data value might be in a 9-bit format, each 3-bit component thereof representing one of the RGB components. These three component values also represent coordinates within a cube, rather than a square structure, that is simulated and used during the expansion process. The cube size is $N^3$, wherein $N^3=2^z$ and $Z=$the inverse table address size. The initialization of the cube is the same as in the square structure: each color palette value is treated as a 3-dimensional coordinate into the cube and the inverse table entry (star) associated with one of those coordinates is set equal to the color palette index (star value) for the color palette value.

During the expansion procedure, each expansion iteration for a star defines a complete cube around the star rather than a square frame. The set of corners C1–C8 of the expansion cube are identified by (star coordinate $+(J,J,J)$, $(J,J,-J)$, $(J,-J,J)$, $(-J,J,J)$, $(J,-J,-J)$, $(-J,-J,J)$, $(-J,-J,J)$ and $(-J,-J,-J)$). Thus, each corner that is J units from the star space is identified. Further, six sides are defined by each set of four corners.

Each 2-dimensional side is analyzed. Using the corners described above, one side is defined by corners C2, C5, C6, and C8. For example, if the star is at (1,1,1) then the corners are at (2,2,0), (2,0,0), (0,2,0) and (0,0,0). Using standard 2-dimensional coordinate analysis, each space within that side can be identified and analyzed. Each space in the side is identified by identifying all spaces in a particular plane between the corners. In the example, the side lies in the Blue (z) dimension. Thus, the spaces of interest are between $R=0-2$ and $G=0-2$.

1. begin with $R=0$, $G=0$, $B=0$, identify the (R,G,B) space;
2. increment R until $R=3$, identifying each (R,B,G) space; and
3. increment G and repeat step 2 until $G=3$. Each of the spaces in the side will then have been identified.

As with the 2-dimensional system, the 3-dimensional system can use a set of flags associated with each side S1–S6 of each star's expansion cube to indicate when the side is inactive and expansion in that direction should not be attempted. The steps for identifying inactive sides are the same as for the 2-dimensional model. Clearly, these same concepts can be implemented in a 4-dimensional CMYK display system.

In one actual embodiment, the present invention is used to generate a 15-bit inverse table that maps 24-bit image data to an 8-bit color palette LUT. The inverse table is used in an RGB system. The general method is the same as that described above for 3-dimensional systems. However, the 15-bit inverse table addresses are constructed from 24-bit image data.

Each 24-bit image data value includes three color components comprised of 8-bits of Red, Green and Blue information. The most significant 5-bits are extracted from each 8-bit component and concatenated to form a 15-bit value. Because 15-bits are used, $2^{15}$ or 32,768 unique values can be represented; this is the size of the inverse table. Similarly, the simulated cube includes the same number of values and is $32 \times 32 \times 32$ ($32^3 = 2^{15}$). When the inverse table is used, the 24-bit image data values are transformed into 15-bit values and used to index the inverse table.

To initially map the star values to inverse table values, assume the star values are T-bit with $T \leq 15$. If $T = 15$, then each star is mapped directly to the inverse table address equal to the star value. Otherwise, the star value may be mapped to the first inverse table value with the most significant T-bits equal to the star value. The remainder of the inverse table filling process is identical to the process described above.

In one actual application, the inverse table can be used in a straightforward manner: the input image data value is used to look-up a color palette address, which in turn identifies the color palette value that is the closest match to the image data value. However, other areas of display technology may be implemented to enhance the image, or data, that is to be displayed. One possibility is to use the inverse-table to map an image data value to its closest color in the display palette then perform an error diffusion process against the input and output values. For example, if the input image data value represents a light green and the closest color palette value is a darker green, the difference between the lighter and darker green can be calculated, and that difference added to one or more image data values surrounding the value of interest. This process diffuses the inevitable nearestmatch error caused by the need to approximate the input values with available color values into other image data values. The result is better and smoother approximation of color, at the cost of some blurring of sharp images.

Rendering techniques such as error diffusion can be used in a number of different applications. These image enhancement techniques are known in the art and can be incorporated into an overall system along with the present invention to increase the overall efficiency of the display process.

While preferred embodiments of the invention have been illustrated and described, it will be appreciated that various changes can be made therein without departing from the spirit and scope of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating an inverse table in a computer memory device for associating a large set of source values with a smaller set of destination values, each value in the source set having a binary representation of N components, the method including the steps of:
   (a) establishing an inverse table in a computer memory device, said inverse table having a number of inverse table entries addressable by a set of source values, wherein each of said source values is r-bits;
   (b) simulating an N-dimensional symmetrical structure in the computer memory device of size q, wherein $q^N = 2^r$, said N-dimensional symmetrical structure comprising spaces having space coordinates, each space coordinate corresponding to an inverse table address;
   (c) for each destination value of a set of destination values, identifying a star space associated with said destination value, termed star value, based on a relationship between said destination value and said associated star space;
   (d) initializing a unit counter N-dimensional symmetrical J;
   (e) until each space in said structure is captured: for each star space:
      (i) expanding out J spaces from said star space in each of 2N possible directions;
      (ii) capturing each uncaptured space encompassed by said expansion; and
      (iii) incrementing unit counter J and returning to substep (i); and
   (f) for each inverse table address, entering the star value that captured a space associated with said inverse table address, at substep (e)(ii), into said inverse table, whereby each source value is associated with a destination value that is an approximation to said source value based on said relationship.

2. A method as claimed in claim 1, wherein said relationship is a closest match relationship between said source values and said destination values, and said substep (c) includes the step of identifying for each destination value the source value that best approximates said destination value.

3. A method as claimed in claim 1, wherein said destination values are indices into a table of final values with which the source values will be associated, and said relationship is a closest match relationship between said source values and said final values, whereby said number of inverse table entries include destination values, each of which indexes an entry in said table of final values.

4. A method as claimed in claim 1, wherein said N-dimensional symmetrical structure and said inverse table are a single data structure in the computer memory device, and said substep (e)(ii) of capturing a space with a star value is performed in conjunction with said substep (f) of entering said star value into said inverse table at an address corresponding to said space coordinates.

5. A method as claimed in claim 1, wherein said step of capturing each uncaptured space includes the step of setting a capture flag for each space when it is captured, such that if said capture flag is set for a particular space, said space is no longer analyzed.

6. A method as claimed in claim 5, wherein said step of expanding out J spaces from said star space includes the step of determining whether each space encompassed by said expansion is beyond said N-dimensional symmetrical structure, such that said step of capturing each uncaptured space does not analyze any space determined to be beyond said N-dimensional symmetrical structure.

7. A method as claimed in claim 5, wherein if no spaces are captured at substep (e)(ii) in a given direction w for a given star u, then at substep (e)(i) for star u no expansion is performed in direction w.

8. A method as claimed in claim 1, wherein unit counter J is initialized to zero.

9. A method as claimed in claim 1, wherein unit counter J is initialized to an integer and at substep (c) said inverse table is initialized by entering a star value into said inverse table at an inverse table address corresponding to said identified star space.

10. A method for generating an inverse table in a computer memory device for associating a set of image data values with a smaller set of color palette values, each image data value having a binary representation including N components, and each color palette value being associated with a color palette index, the method including the steps of:

(a) establishing an inverse table in a computer memory device, said inverse table having a number of inverse table entries addressable by a set of image data values, wherein each of said image data values is r-bits;

(b) simulating an N-dimensional symmetrical structure in the computer memory device of size q, wherein $q^N = 2^r$, said N-dimensional symmetrical structure comprising spaces having space coordinates, each space coordinate corresponding to an inverse table address;

(c) for each color palette value, identifying a star space associated with said color palette value such that the inverse table address corresponding to said star space approximates said color palette value;

(d) initializing a unit counter J; and (e) until each space in said N-dimensional symmetrical structure is captured: for each star space:
  (i) expanding out J spaces from said star space in each of 2N possible directions;
  (ii) capturing each uncaptured space encompassed by said expansion by entering index associated with the color palette value by which the star space was captured at an inverse table entry address corresponding to said captured space; and
  (iii) incrementing unit $o^r$ and returning to substep (i); whereby said inverse table is filled with color palette indices and can be used during a display process to generate indices into said color palette values.

11. A method as claimed in claim 10, wherein unit counter J is initialized to zero.

12. A method as claimed in claim 10, wherein unit counter J is initialized to an integer and at substep (c) said inverse table is initialized by entering a color palette index into said inverse table at an inverse table address corresponding to said identified star space.

* * * * *

UNITED STATES PATENT AND TRADEMARK OFFICE
CERTIFICATE OF CORRECTION

PATENT NO. : 5,384,902
DATED : January 24, 1995
INVENTOR(S) : S.E. Carlsen

It is certified that error appears in the above-indentified patent and that said Letters Patent is hereby corrected as shown below:

| COLUMN | LINE | |
|---|---|---|
| 1 | 44 | "his" should read --has-- |
| 2 | 23 | "dam," should read --data,-- |
| 5 | 50 | "carded" should read --carried-- |
| 6 | 50 | "comer" should read --corner-- |
| 6 | 51 | "comer" should read --corner-- |
| 6 | 52 | "comer" should read --corner-- |
| 6 | 53 | "comer" should read --corner-- |
| 7 | 27 | "an integer, i.e., is also set to zero." should read --is also set to an integer, i.e., zero.-- |
| 7 | 53 | "comer" should read --corner-- |
| 7 | 55 | "comer" should read --corner-- |
| 7 | 58 | "comers" should read --corners-- |
| 7 | 65 | "comers" should read --corners-- |

UNITED STATES PATENT AND TRADEMARK OFFICE
CERTIFICATE OF CORRECTION

PATENT NO. : 5,384,902
DATED : January 24, 1995
INVENTOR(S) : S.E. Carlsen

It is certified that error appears in the above-indentified patent and that said Letters Patent is hereby corrected as shown below:

| COLUMN | LINE | |
|---|---|---|
| 9 | 17 | "comer" should read --corner-- |
| 9 | 20 | "comer" should read --corner-- |
| 9 | 36 | "comer" should read --corner-- |
| 10 | 31 | "comers" should read --corners-- |
| 10 | 34 | "(-J,-J,J)," (first occurrence) should read --(-J,J,-J),-- |

UNITED STATES PATENT AND TRADEMARK OFFICE
CERTIFICATE OF CORRECTION

PATENT NO. : 5,384,902
DATED : January 24, 1995
INVENTOR(S) : S.E. Carlsen

It is certified that error appears in the above-indentified patent and that said Letters Patent is hereby corrected as shown below:

| | | |
|---|---|---|
| 10 | 38-39 | "comers" should read --corners-- |
| 10 | 64 | "image. data" should read --image data-- |
| 11 | 36 | "nearestmatch" should read --nearest match-- |
| 14 (Claim 10, | 14 line 34) | "o$^r$" should read --J-- |

Signed and Sealed this

Twenty-seventh Day of June, 1995

Attest:

BRUCE LEHMAN

Attesting Officer     Commissioner of Patents and Trademarks